Dec. 8, 1953   T. H. KENNEDY   2,661,575
APPARATUS FOR FLUFFING SLAG
Filed Oct. 26, 1950
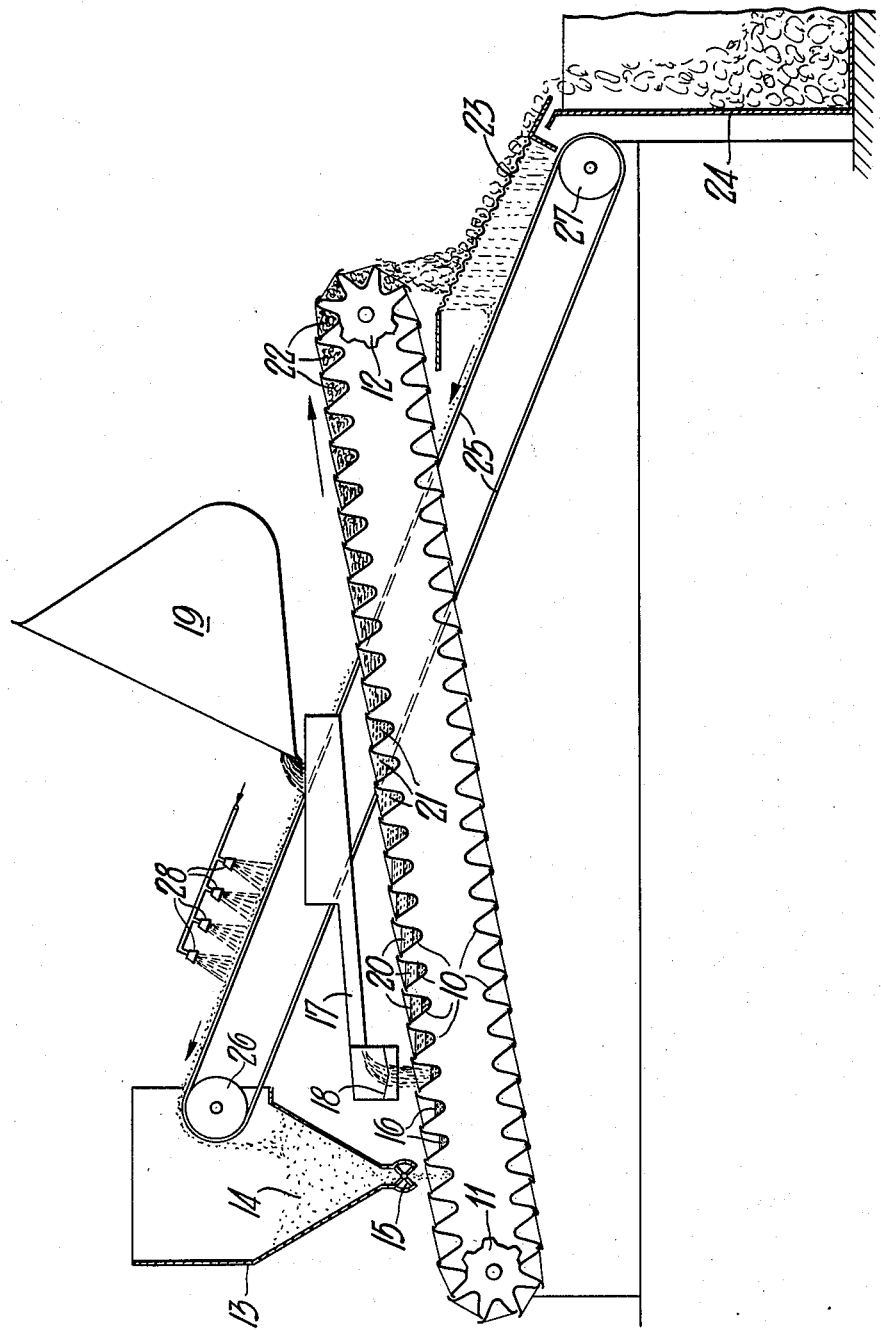
Inventor:
TRUMAN H. KENNEDY,
by: Donald G. Dalton
his Attorney.

Patented Dec. 8, 1953

2,661,575

UNITED STATES PATENT OFFICE 2,661,575

APPARATUS FOR FLUFFING SLAG

Truman H. Kennedy, Elizabeth Township, Allegheny County, Pa., assignor to United States Steel Corporation, a corporation of New Jersey Application October 26, 1950, Serial No. 192,324

1 Claim. (Cl. 49—1)

This invention relates to apparatus for treating slag from steel plants to make it useful as an aggregate for concrete and for other purposes.

For many years, the steel industry has been trying to find a commercial outlet for its huge volumes of slag. The building and construction trades have generally agreed to use an expanded or fluffed slag as aggregate in the manufacture of concrete building blocks, slabs for radiant heating coils, pre-cast roof and floor slabs, and other masonry products, provided it meets the essential physical requirements. Basically, a fluffed slag for use as a concrete aggregate must have a high compressive strength, a low density, a low moisture content, the proper size gradation, and a desirable coloration.

Fluffed or expanded slag is distinguished from the commonly known granulated slag by its superior physical properties and uniform cellular structure. Granulated slag is a light tan colored foamy material containing large air cells with a high water content and a low compressive strength. In contrast thereto, expanded slag is somewhat grey in color having a low moisture content, a high compressive strength, and a uniform cellular structure. Granulated slag is made by dumping molten slag into a pit containing water or the slag is poured into a water-bearing flume. Another method utilizes streams of water under high pressure against the molten slag as it is poured into pits.

There are several processes known today for the treatment of slag for commercial use, but few make a fluffed slag economically suitable for concrete aggregate. All those with which I am familiar, furthermore, are characterized by serious objections from the standpoint of practical operations. The object of the more recent methods of slag expansion has been to secure better control in the rate of cooling from the molten slag to the finished product. Rapid cooling tends to produce a tan-colored granular glassy crystalline structure which is extremely light and brittle whereas slow cooling, such as air cooling, tends to produce a heavy dark grey cellular slag. Each of these extremes fails to meet the qualifications for a good light-weight concrete aggregate.

I have invented a novel apparatus for fluffing slag, the product of which has proved highly satisfactory for use as a light-weight aggregate in concrete. In a preferred embodiment and practice of the invention, I partly fill a series of traveling containers with wet slag fines and then pour molten slag therein. During continued travel of the containers, the slag is fluffed by the agitation resulting from the vaporization of the water in the fines by the heat of the initially molten slag. When the slag has been thus fluffed and cooled, the containers are dumped successively on to a sizing screen. The fines passing therethrough are wetted and again used for partly filling additional containers while the larger particles are collected for use as aggregate. The apparatus preferably includes an endless chain of molds traversing spaced sprockets, a hopper for delivering wet fines to the molds, a runner or launder for conducting molten slag thereto and a conveyor for returning to the hopper the fines passing through the aforementioned screen.

A complete understanding of the invention may be obtained from the following detailed description and explanation thereof which refer to the accompanying drawing, the single figure of which illustrates diagrammatically the preferred embodiment of the apparatus of my invention in side elevation, with parts in vertical section.

Referring in detail to the drawing, a plurality of containers or buckets 10 are carried on an endless-chain conveyor trained about spaced sprockets 11 and 12. The sprocket 12 is driven at a suitable speed by any convenient means, not shown. A hopper 13 above the conveyor adjacent one end thereof contains a supply of wet slag fines 14 which may be either granulated slag or fluffed slag. A paddle-wheel gate 15 at the bottom of the hopper controls the supply of fines to the molds or containers 10 as they travel below the hopper. This gate is so designed and its operation so correlated with the speed of the travel of the conveyor that the molds are partly filled with a bottom layer of wet fines as indicated at 16.

A slag runner 17 and trough 18 are mounted on suitable supports (not shown) above the conveyor. The runner is adapted to receive molten slag from a carrier vessel such as a ladle 19 and the trough 18 serves to deliver molten slag to the molds 10 successively, thereby forming a layer 20 on top of the layer of wet fines 16 in each mold. As the travel of the mold continues, the heat of the molten slag in layer 20 vaporizes the water adhering to the fines in layer 16. The resulting steam agitates the molten slag as it rises therethrough from the layer 16, as indicated at 21. After further travel of the molds, the molten slag becomes completely fluffed as indicated at 22 and, incidentally, is cooled substantially.

As the molds 10 pass around the sprocket 12, the contents thereof are dumped on to a sloping screen 23 of a mesh such as to cause separation of the fines from the larger particles suitable for use as aggregate for concrete. The larger particles roll down the screen into a storage bin or car 24. The fines fall on to a belt conveyor 25 traveling about spaced pulleys 26 and 27, one of which is driven by any convenient means (not shown). The fines falling on the conveyor 25 are carried upwardly thereby and before reaching the upper end of the conveyor are subjected to water sprays discharged by nozzles 28 mounted above the conveyor. The fines, after being thoroughly wetted by the water sprays, are discharged into the hopper 13 to form part of the mass 14 from which they are again discharged into the molds 10 as needed for re-use in fluffing additional molten slag. Since the fluffing operation produces a small percentage of fines, in addition to particles of the size desired for aggregate, the amount of fines in process will increase above the original supply and it will be desirable therefore to divert the returning fines intermittently or a portion thereof continuously from the hopper 13 for other disposition.

Experience has shown that if the containers used for receiving the fines and molten slag are eight inches deep, they should be filled to a level of about four inches with wet slag fines and that the layer of molten slag poured thereon should be about two inches deep. This results in a layer of fluffed slag of about four inches deep. Molten slag fluffed to twice its original volume satisfactorily meets the physical requirements for a suitable light-weight concrete aggregate as enumerated hereinabove. In any event, the characteristics of the product may be varied as described by controlling the amount of wet fines initially delivered to the molds and the quantity of molten slag poured thereon.

It will be apparent that the method and apparatus of my invention are well suited for exact control of the operation to insure production of fluffed slag useful as aggregate. By proper control of the moisture content of the wet fines and the amount of the latter, the proper degree of fluffing can be obtained for any given amount of molten slag within the capacity of the molds or containers. The apparatus involved is relatively simple in construction and operation and once it has been started requires little or no maintenance or attention but continues to operate indefinitely with only general supervision.

Although I have disclosed herein the preferred practice and embodiment of my invention, I intend to cover as well any change or modification therein which may be made without departing from the spirit and scope of the invention.

I claim:

In an apparatus for making fluffed slag, the combination with a chain-bucket conveyor, of a hopper for discharging wet slag fines into the conveyor buckets successively, means for continuously discharging molten slag into the buckets successively at a point beyond the hopper in the direction of bucket travel, a screen below the conveyor at the discharge end thereof adapted to receive fluffed slag falling from the buckets as they turn over successively, a return conveyor extending from below said screen to said hopper and means for wetting the slag fines which pass through the screen and fall on the return conveyor, as they approach the hopper.

TRUMAN H. KENNEDY.

References Cited in the file of this patent
UNITED STATES PATENTS

| Number | Name | Date |
| --- | --- | --- |
| 715,868 | Rhood | Dec. 16, 1902 |
| 1,843,716 | Giller | Feb. 2, 1932 |
| 1,916,954 | Krause | July 4, 1933 |
| 1,947,488 | Newhouse | Feb. 20, 1934 |
| 2,562,149 | Mollring | July 24, 1951 |